United States Patent [19]

Minamida et al.

[11] Patent Number: 5,635,306

[45] Date of Patent: Jun. 3, 1997

[54] HONEYCOMB PANEL AND PROCESS FOR PRODUCING SAME

[75] Inventors: Katsuhiro Minamida; Masashi Oikawa; Atsushi Sugihashi; Akira Ishibashi, all of Sagamihara; Mamoru Takeda, Tokyo, all of Japan

[73] Assignee: Nippon Steel Corporation, Tokyo, Japan

[21] Appl. No.: 485,884

[22] Filed: Jun. 7, 1995

Related U.S. Application Data

[63] Continuation of Ser. No. 150,163, Nov. 30, 1993, abandoned.

[30] Foreign Application Priority Data

| Mar. 30, 1992 | [JP] | Japan | 4-071918 |
| Mar. 30, 1992 | [JP] | Japan | 4-071921 |
| Mar. 30, 1992 | [JP] | Japan | 4-071926 |

[51] Int. Cl.$^6$ .............. B32B 3/02; B32B 3/12; B32B 3/28; B23K 26/00
[52] U.S. Cl. .............. 428/593; 52/793.1; 228/181; 29/897.32
[58] Field of Search .............. 52/793.1; 428/593, 428/603; 228/181; 29/897.32

[56] References Cited

U.S. PATENT DOCUMENTS

| 2,947,041 | 8/1960 | Imbrecht | 29/897.32 |
| 3,024,879 | 3/1962 | Kandra | 29/897.32 |
| 3,267,626 | 8/1966 | Daly | 52/145 |
| 3,285,644 | 11/1966 | Tomek | 287/189.36 |
| 3,476,422 | 11/1969 | Campbell | 228/181 |
| 3,526,031 | 9/1970 | Truitt | 228/181 |
| 3,563,800 | 2/1971 | Armitage | 52/394 |
| 3,693,750 | 9/1972 | Takkunen | 181/33 C |
| 3,994,105 | 11/1976 | Jamison et al. | 52/127 |
| 4,197,341 | 4/1980 | Rule | 428/118 |
| 4,348,442 | 9/1982 | Figge | 428/72 |
| 4,643,933 | 2/1987 | Picken | 428/593 |
| 4,695,495 | 9/1987 | Ault | 428/593 |
| 5,007,225 | 4/1991 | Teasdale | 52/799 |
| 5,199,632 | 4/1993 | Takeichi et al. | 228/181 |

FOREIGN PATENT DOCUMENTS

| 2249769 | 5/1975 | European Pat. Off. . | |
| 0069401 | 1/1983 | European Pat. Off. . | |
| 2449190 | 10/1980 | France | 52/799 |
| 59-135145 | 8/1984 | Japan . | |
| 61-141541 | 6/1986 | Japan . | |
| 62-238072 | 10/1987 | Japan . | |
| 708033 | 1/1980 | U.S.S.R. | 52/799 |
| 781291 | 11/1980 | U.S.S.R. | 52/799 |

OTHER PUBLICATIONS

F. F. Rechlin, "6 Basic Design Suggestions for Brazed HoneyComb Sandwich", Product Engineering, Mid-Sep. 1959, pp. 375-377.

*Primary Examiner*—John Zimmerman
*Attorney, Agent, or Firm*—Kenyon & Kenyon

[57] ABSTRACT

The present invention is a honeycomb panel comprising metal face sheets respectively disposed on upper and lower faces of said honeycomb core characterized in that said honeycomb panel has a metal side plate disposed on at least one side face thereof, for mutually connecting honeycomb panels to each other, and a process for producing a honeycomb panel, said process characterized by comprising the steps of: welding a corrugated honeycomb core at an end face of its corrugation to a side plate along the end face of said corrugation; welding the honeycomb core at top portions of its corrugation to an upper face sheet from the side of the honeycomb core by means of an energy beam; welding bottom portions of the corrugation of the honeycomb core to a lower face sheet from the side of the face sheet by means of an energy beam; and welding the face sheets to the side plate before or after welding the honeycomb core to the face sheets.

4 Claims, 7 Drawing Sheets

HONEYCOMB PANEL AND PROCESS FOR PRODUCING SAME

This application is a continuation of application Ser. No. 08/150,163 filed Nov. 30, 1993 now abandoned.

TECHNICAL FIELD

This invention relates to a honeycomb panel made of a metal such as a stainless steel or titanium. The honeycomb panel comprises a honeycomb core sandwiched at its upper and lower faces between a pair of face sheets. The honeycomb core usually has a corrugated section and is joined to the face sheets by adhesion, melt process or the like. The honeycomb panel having such a structure is very light in weight and has a high strength. Honeycomb panels of this type are used in aircraft, marine vessels, vehicles, etc.

BACKGROUND ART

A honeycomb structure having a wide area is produced by joining honeycomb panels to each other. FIGS. 10A and 10B show an example of the joining method described in Japanese Unexamined Patent Publication (Kokai) No. 62-238072. In FIG. 10A, when a honeycomb panel 1-1 and a honeycomb panel 1-2 are joined to each other, a face sheet 2a-1 is joined to a face sheet 2a-2 and a face sheet 2b-1 is joined to a face sheet 2b-2, but honeycomb cores 3-1 and 3-2 have a small thickness and all of these members are not always positioned for butt welding with each other. Therefor, since the face sheets alone are joined to each other, a problem arises in that a satisfactory bond between the honeycomb panels can not be attained as will be described in detail later.

In FIG. 10B, an insert material 4 having a height larger than the thickness of the honeycomb panels is put between the honeycomb panels, and welding is effected between the face sheets 2a-1 and 2a-2 and between the face sheets 2b-1 and 2b-2 via the insert material 4. In the method shown in FIG. 10B, however, since the face sheets alone are joined to each other without joining of the honeycomb cores, a problem arises in that s satisfactory bond strength can not be attained as will be described in detail later. Further, the protruded insert material 4 causes the joints to bulge, which spoils the appearance of the resultant honeycomb structure. Moreover, it is troublesome to insert the insert material each time joining is to be effected.

DISCLOSURE OF INVENTION

An object of the present invention is to provide a honeycomb panel that can ensure a sufficient bond strength, has a good appearance as joined by virtue of being free from bulging at the joints, and can be easily welded.

According to the present invention, the above-mentioned object is achieved by a honeycomb panel comprising metal face sheets respectively disposed on upper and lower faces of said honeycomb core, characterized in that said honeycomb panel has a metal side plate disposed on at least one side face thereof, for mutually connecting other honeycomb panels to each other.

The above-mentioned object is also achieved by a honeycomb panel in which projections for mutually connecting other honeycomb panel to each other are disposed on the side plate, and by a honeycomb panel in which grooves for mutually connecting other honeycomb panels to each other are disposed on the side plate.

According to the present invention, the above-mentioned object is also achieved by a process comprising the steps of;

(1) welding a corrugated honeycomb core at an end face of its corrugation to a side plate contacted vertically with its corrugation, (2) welding the honeycomb core at the top portions of its corrugation to an upper face sheet from the side of the honeycomb core by means of an energy beam, (3) welding the the honeycomb core at the bottom portion of its corrugation to a lower face sheet from the side of the face sheet by means of an energy beam, (4) welding the face sheets to a side plate contacted vertically with the corrugation of the honeycomb core, and (5) welding the face sheets to a side plate contacted parallel with the corrugation. The above mentioned order of the welding steps may be changed so long as all of these steps are consequently effected. For example, when the honeycomb core has not yet been welded to the face sheet, the above steps can be carried out in the order of (1), (4), (2), (3), and (5).

BRIEF DESCRIPTION OF THE DRAWINGS

FIG. 1A is a perspective view of the honeycomb panel; FIG. 1B is a view of the section taken along line Y—Y of FIG. 1A; FIG. 1C is a view of the section taken along line X—X of FIG. 1A; and FIG. 1D is a partially perspective and partially sectional view of the honeycomb panel;

FIG. 4A is a entire sectional view of said honeycomb panel; and FIG. 4B is a partial view of a joint between similer said honeycomb panels;

FIGS. 5A and 5B are entire sectional views of said panels; and FIG. 5C is a partial sectional view of a joint between said panels;

FIG. 6A is a partial perspective view of said side plate; and FIG. 6B is a partial sectional view of a fitting portion between a side plate and a honeycomb core;

FIG. 9A is a plan view of the honeycomb core; FIG. 9B is a perspective view of a joint between the honeycomb core and the side plate; FIG. 9C is a sectional view of a joint between a face sheet and the top faces of the honeycomb core; FIG. 9D is a sectional view of a joint between the face sheet and the bottom faces of the honeycomb core; and FIG. 9E is a sectional view of a joint between the face sheet and side plate.

BEST MODE FOR CARRYING OUT THE INVENTION

The best mode for carrying out the invention will be described with reference to the accompanying drawings.

Figure 1A:
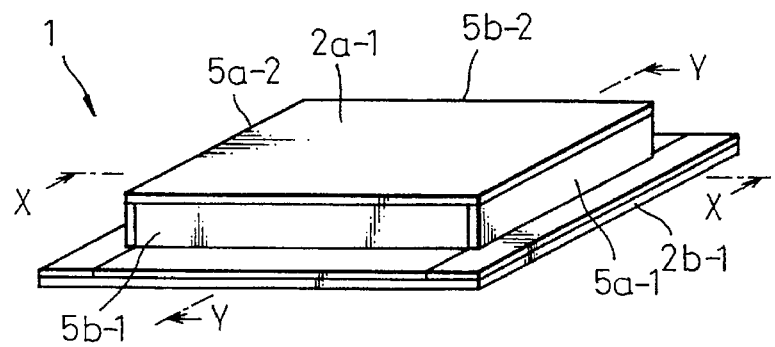
FIGS. 1A to 1D show a honeycomb panel according to the present invention.
Figure 1B:
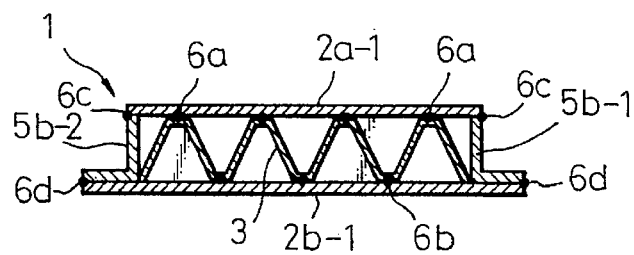
Figure 1C:
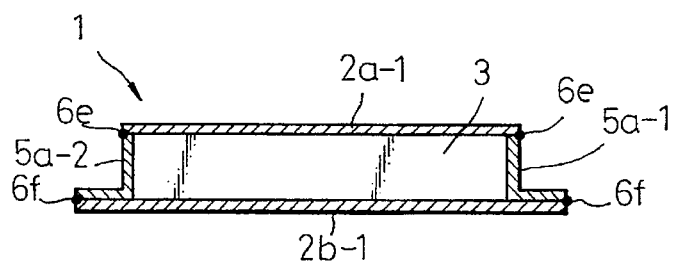

FIGS. 1A to 1D show an example of the honeycomb panel according to the present invention, in which FIG. 1A is a perspective view of the appearance, FIG. 1B is a sectional view taken along line Y—Y of FIG. 1A, and FIG. 1C is a sectional view taken along line X—X of FIG. 1A. A honeycomb panel according to the present invention relates to a rectangular honeycomb panel 1 comprising a metallic honeycomb core 3 and metallic face sheets 2a-1, 2b-1 respectively disposed on the upper and lower surface of the honeycomb core, and in which metal side plates, 5a-1, 5a-2, 5b-1, 5b-2 for connecting honeycomb panels together are disposed on at least one side face.

In the examples of FIGS. 1A to 1D, the side plates 5a-1, 5a-2, 5b-1, 5b-2 disposed on four side faces of the honeycomb panel are L-shaped with the top end of the vertical portion being in contact with the inner surface of one end of the upper face sheet 2a-1. When two honeycomb panels alone are mutually joined to each other, the side plate 5 may only be disposed on one side face of the honeycomb panel 1. Although FIGS. 1A to 1D show a side plate having an L-shaped section, it may have a flat or U-shaped section. Further, as will be described in detail later, it may have a concave or convex section. In any case, the top face of one of these side plates is in contact with an inner surface of one end of the upper face sheet 2a-1, and side faces facing each other are in contact with each other.

In FIG. 1B, symbols 6a, 6b designate a joint between the face sheet 2a-a and 2b-1 and the honeycomb core 3, and the honeycomb core 3 is joined to the sheets 2a-1 and 2b-1 by energy beam welding or the like. Although FIG. 1B shows the joints 6a and 6b each having single welding portion, the number of welding portions is determined in accordance with the strength required of the honeycomb panel. Further, use may be made of other welding methods, such as seam welding or pulse welding. In FIGS. 1B and 1C, numerals 6c, 6d, 6e, 6f designate a joint between the face sheet and the side plates, in which the side plates 5a-1, 5b-1 and so on are joined to the face sheets 2a-1 and 2b-1 by energy beam welding or the like.

Figure 1D:
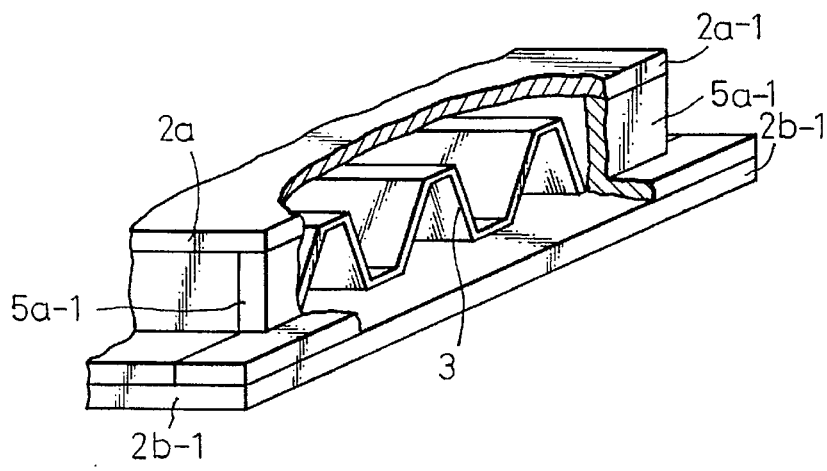

In FIG. 1C, the side plates 5a-1 and 5a-2 are disposed along the end face of the corrugation of the honeycomb core 3. FIG. 1D is a partially perspective and partially sectional view of a joint between the side plate 5a-1 and the end face of its corrugation of the honeycomb core 3. In the honeycomb panel of the present invention, the end face of the corrugation of the honeycomb core 3 and the inner surface of the side plate 5a-1 are joined to each other, for example, by energy beam welding.

Figure 2:
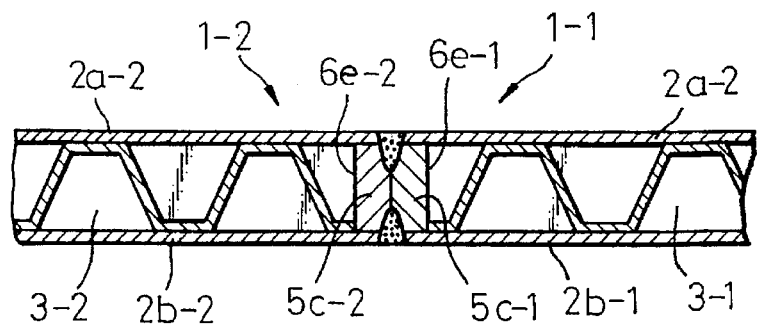
FIG. 2 is a partial sectional view of a joint between the honeycomb panels according to the present invention.
Figure 10A:
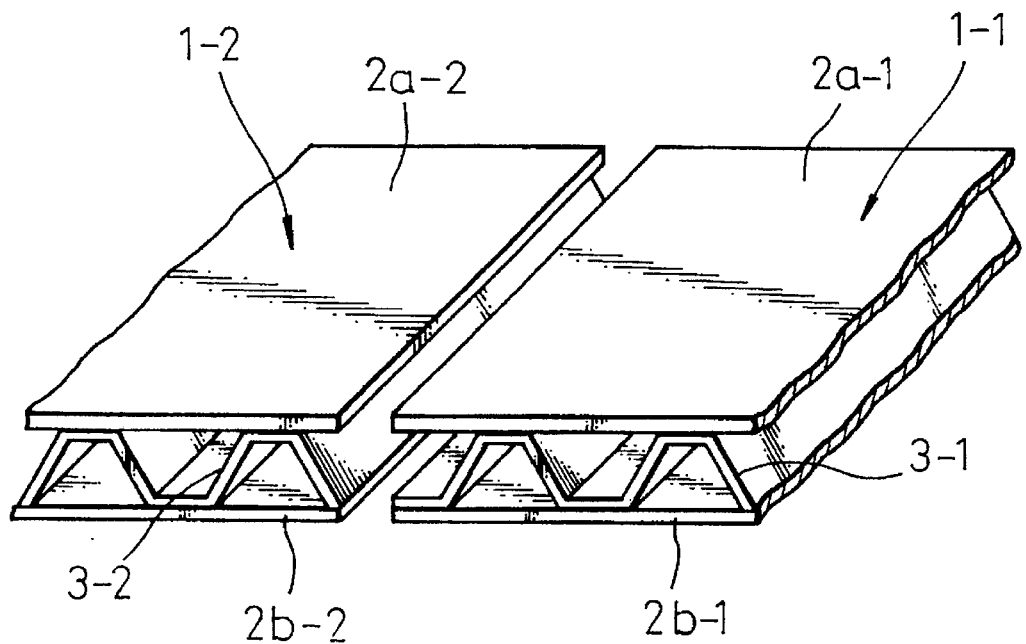
FIGS. 10A and 10B are a partial sectional view of a joint of the conventional arts.
Figure 10B:
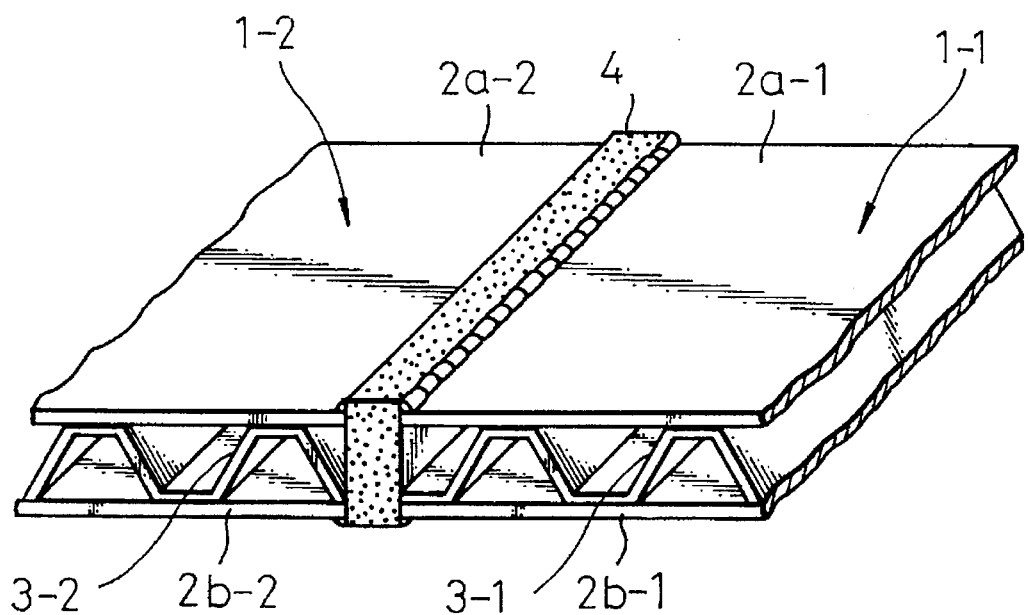

FIG. 2 is a partial sectional view of a joint between the honeycomb panels 1-1 and 1-2 according to the present invention. In joining the honeycomb panels 1-1 and 1-2 to each other according to the present invention, it is possible to additionally join a side plate 5c-1 to a side plate 5c-2 besides the joining of the face sheet 2a-1 to the face sheet 2a-2 and the joining of the face sheet 2b-1 to the face sheet 2b-2. Further, in this method, since the insert material 4 shown in FIG. 10B, which has a height larger than the thickness of the honeycomb panel, is not used, a joint having a good appearance can be provided without the occurrence of a bulge.

As described in above explanation in connection with FIG. 1D, in the honeycomb panel of the present invention, the corrugated edge portion of the honeycomb core 3 and the side plate 5a-1 are joined to each other by welding. In FIG. 2, symbol 6e-1 designates the weld. Therefore, the side plate 5c-1 add to the rigidity and strength of the honeycomb core 3-1. Similarly, since the corrugated edge portion of the honeycomb core 3-2 and the side plate 5c-2 are joined to each other at a weld 6e-2, the side plate 5c-2 adds to the rigidity and strength of the honeycomb core 3-2. Therefore, when the side plate 5c-1 and the side plate 5c-2 are welded to each other, the welds 6e-1 and 6e-2 add to the rigidity and strength of the honeycomb core 3-1 and 3-2, so that there is no possibility that the rigidity or strength is reduced at the weld. This enables a honeycomb structure comprising several honeycomb panels to have the same rigidity and strength as a large seamless honeycomb panel.

Figure 3:
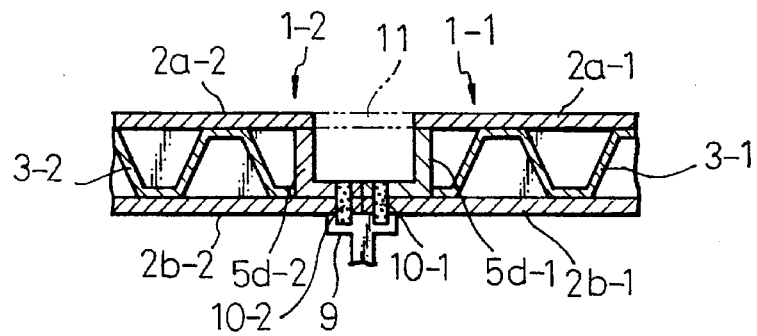
FIG. 3 is a partial sectional view of a joint between the honeycomb panels having an L-Shaped side plate according to the present invention.

FIG. 3 is a partial sectional view of a honeycomb panel having an L-shaped side plate 5d-1 according to the present invention. For example, when the end portions of honeycomb panels 1-1 and 1-2 are put on a cross beam 9 to join the honeycomb panel 1-1 to the honeycomb panel 1-2, the conventional honeycomb panels have the problems that these honeycomb panels must be removed and that it is difficult to weld a lid 11, as will be described later. In the present invention, joining can be easily effected by using the honeycomb panels having L-shaped side plates 5d-1, 5d-2 and joining flange portions of the side plates 5d-1, 5d-2 to the cross beam 9 to form welds 10-1 and 10-2. In the drawing, numeral 11 designates a lid that serves to render the surface free from any recess and may be joined to the face sheets 2a-1, 2a-2.

Figure 4A:
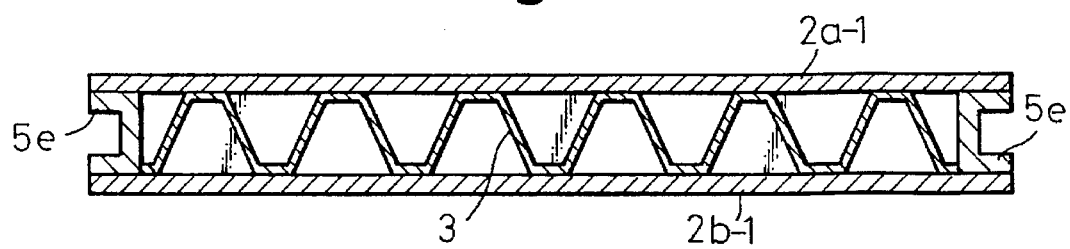
FIGS. 4A and 4B are is a honeycomb panel having U-shaped side plates according to the present invention.
Figure 4B:
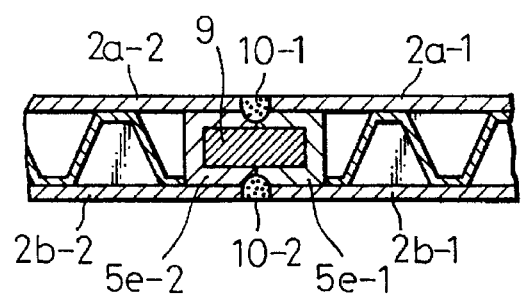

FIG. 4A and 4B are a sectional view of a honeycomb panel having a U-shaped side plate according to the present invention, in which FIG. 4A is an entire view of the section of the honeycomb panel and FIG. 4B is a partial sectional view of the joint between the honeycomb panels. In this case as well, besides the joining of the face sheet 2a-1 to the face sheet 2a-2 and the joining of the face sheet 2b-1 to the face sheet 2b-2, side plates 5e-1 and 5e-2 may be joined to each other by welding to form welds 10-1 and 10-2. Therefore, a higher bond strength can be attained as compared with that of the prior art method in which only the face sheets are mutually joined to each other. Further, it is also possible to use a method in which a cross beam 9 is placed between side plates 5e-1 and 5e-2 which are joined to the cross beam 9 to provide a high bond strength. Further, also in this method, the joints have a good appearance without the occurrence of bulging for the same reason as that described above in connection with FIG. 2.

Figure 5A:
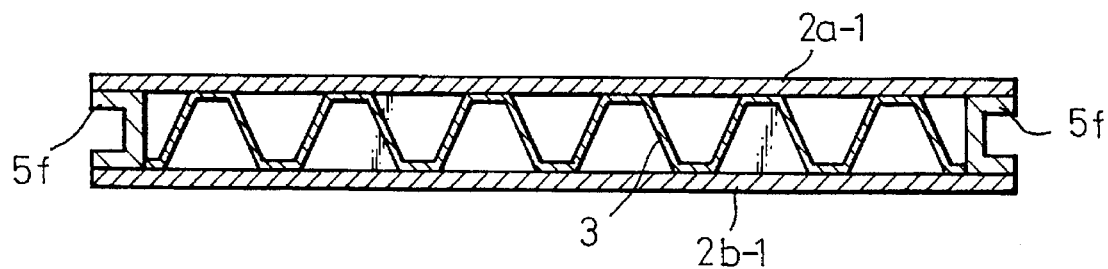
FIGS. 5A to 5C are a honeycomb panel having tongue and groove side plates according to the present invention.
Figure 5B:
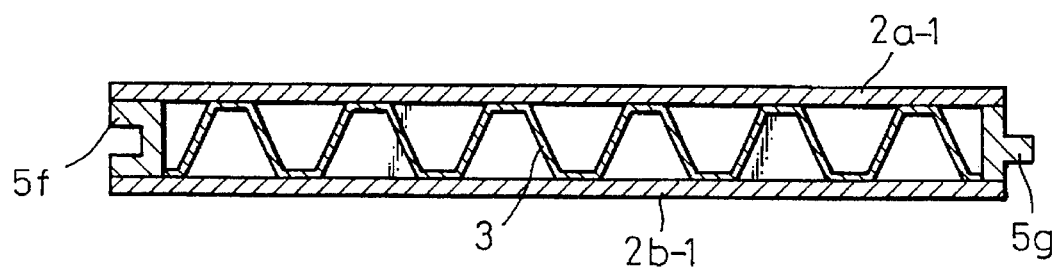
Figure 5C:
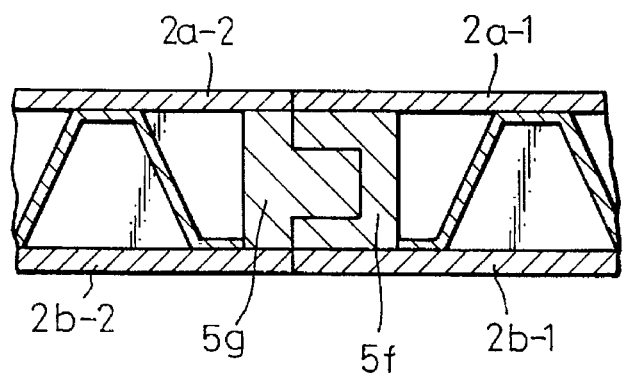

FIGS. 5A to 5C are a sectional view of a honeycomb panel provided with a side plate having transverse concave sections into which convex sections of side plates of other honeycomb panels to be joined to said honeycomb panel are fitted, or a transverse convex section fitted into a concave section of a side plate of another honeycomb panel to be joined to said honeycomb panel, in which FIGS. 5A and 5B are sectional views of honeycomb panels and FIG. 5C is a partially sectional view of the fitting of side plates.

In FIG. 5C, although an example of fitting is shown, it is also possible to join the side plate 5f-1 to the side plate 5g-1 by welding after the completion of fitting in accordance with need. The honeycomb panels having a side plate shown in FIGS. 5A and 5B can be easily joined to each other by fitting. Further, the combined use of fitting and welding can provide strong joining. Also for the honeycomb panel shown in FIGS. 5A to 5C, joints having a good appearance can be provided without occurrence of bulging at the joints.

Figure 6A:
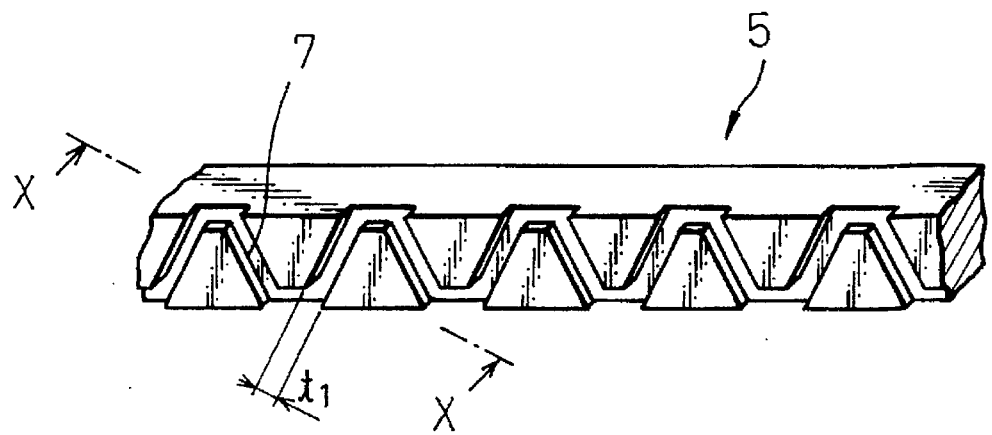
FIGS. 6A and 6B are a side plate provided with fitting grooves according to the present invention.
Figure 6B:
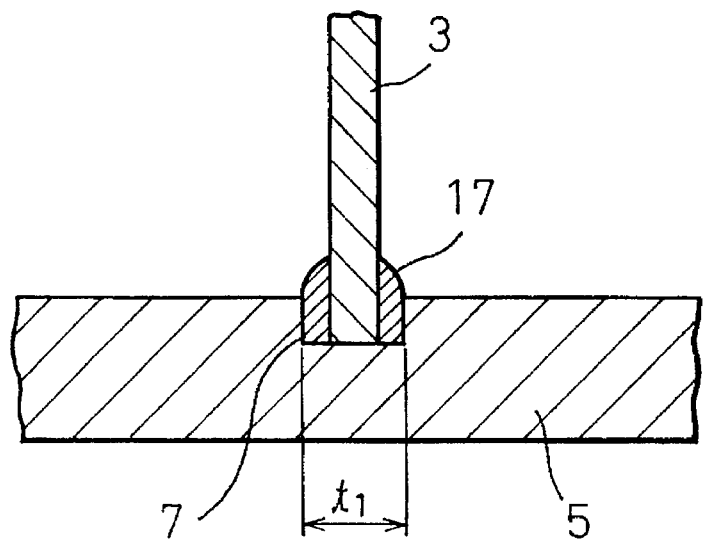

FIG. 6A and 6B show a side plate 5 provided with a corrugated fitting groove 7 into which the end face of its corrugation of a honeycomb core is fitted. A fitting groove 7 having a groove width $t_1$ larger than the sheet thickness of the honeycomb core is previously provided on the side plate 5, for example, by cutting work. In the welding of the end face of its corrugation of the honeycomb core to the side plate 5, the end face of its corrugation of the honeycomb core 3 is first fitted into the fitting groove 7 of the side plate, and welding is then effected along the corrugated cutting plane shown in FIG. 9B. According to this method, when the honeycomb core is welded to the side plate, since welds are mutually fixed, not only the welding operation is easy but also it is possible to form a joint having an excellent dimensional accuracy.

In FIG. 6B, showing a view of the section along line X—X of FIG. 6A, when the groove width $t_1$ of fitting groove 7 is increased, although the honeycomb core 3 can be easily set in the side plate 5, the gap between the honeycomb core 3 and the fitting groove 7 becomes so large that the welding defects must occur. In this case, such as shown in FIG. 6B, after the gap between the fitting groove 7 and the honeycomb core 3 is filled with a metallic filler (a paste and the like), the welding is effected along the corrugated face as shown in FIG. 9B. According to this method, not only can the honeycomb core can be easily set in the side plate but also the welding can be effected in a stable condition. A commercially available paste produced by kneading a nickel powder with an organic solvent, a metallic wire and the like may be used as the metallic filler.

Figure 7:
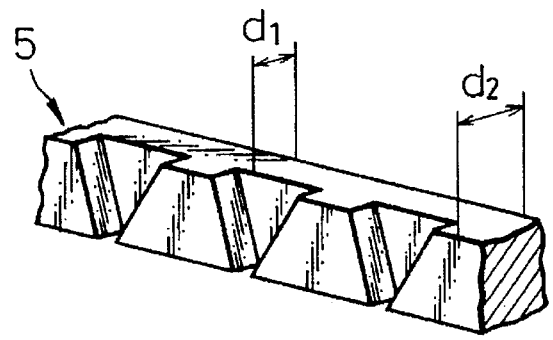
FIG. 7 is a partial perspective view of a side plate having a difference in level according to the present invention.

FIG. 7 shows an embodiment of the side plate 5 having a difference in level formed with the thicknesses $d_1$ and $d_2$, which difference in level has a suitable shape for fitting the end face of the corrugation of the honeycomb core thereinto. The use of this side plate 5 allows the honeycomb core to be easily fitted and set in the side plate 5. In this case, the welding described above in connection with FIG. 9B is effected after the end portion of the corrugation of the honeycomb core 3 is fitted into the difference in level of the side plate 5. According to this method, the honeycomb core 3 and the side plate 5 can be easily welded to each other with a high efficiency.

Figure 8:
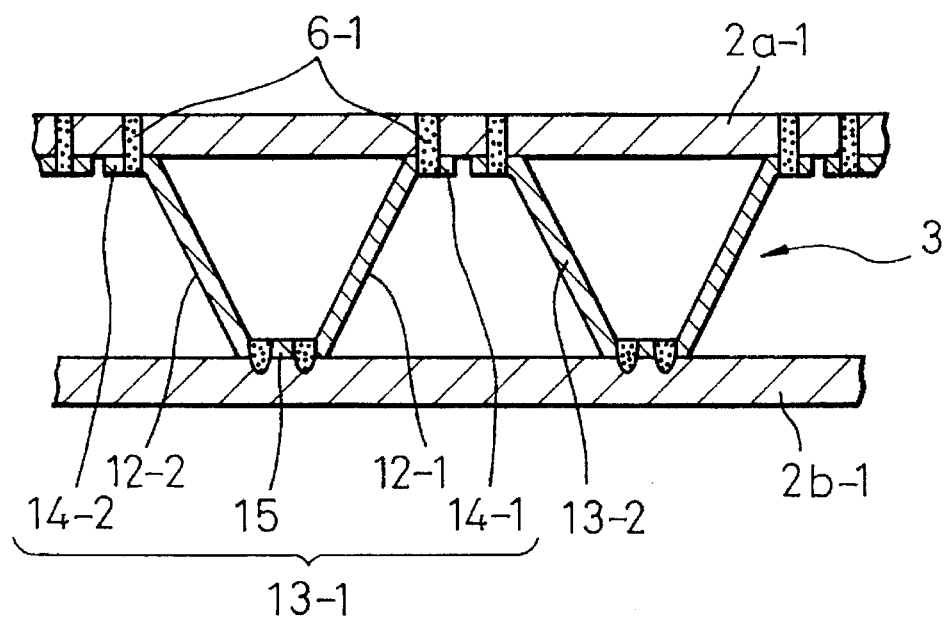
FIG. 8 is a partial sectional view of the honeycomb panel where the honeycomb core is formed of channel-shaped members according to the present invention.

FIG. 8 is an explanatory sectional view of a honeycomb panel according to the present invention. The honeycomb panel of the present invention comprises an upper face sheet $2a$-1, a lower face sheet $2b$-1 and, disposed between the upper face sheet $2a$-1 and the lower face sheet $2b$-1, a honeycomb core 3 comprised of a number of parallel groove materials 13-1, 13-2, . . . , 13-n having the same shape as that of the groove material 13-1 having outward slanted both side faces 12-1 and 12-2 and flanges 14-1 and 14-2 outward disposed on each upper end of the both side faces, the bottom 15 and both flanges 7-1 and 7-2 of the individual groove material 13-1, 13-2, . . . , 13-n being joined to the lower face sheet $2b$-1 and the upper face sheet $2a$-1, respectively.

Specifically, the honeycomb core 3 of the present invention comprises groove materials 13-1, 13-2, . . . , 13-n in one cell placed in order, and the individual groove materials 13-1, 13-2, . . . , 13-n being joined to the upper face sheet $2a$-1 and the lower face sheet $2b$-1.

FIGS. 9B and 6B are an explanatory view for joining the corrugated plate 3 and the side plate 5 to each other. As shown in FIGS. 9B and 6B, the joining of the corrugated plate 3 and the side plate 5 to each other was effected by fitting the end portion of its corrugation of the above-described honeycomb core after molding into the groove previously provided on the side plate 5 and applying a welding laser beam L to the fitted portion using a paste containing a nickel powder. The step of joining the corrugated plate to the side plate was effected for two end faces of the honeycomb panel. It is also possible to use a side plate not provided with grooves as shown in FIGS. 6A and 6B depending upon the shape of the end face of the honeycomb core.

Figure 9A:
FIGS. 9A to 9E show an embodiment of a honeycomb panel according to the present invention.
Figure 9B:
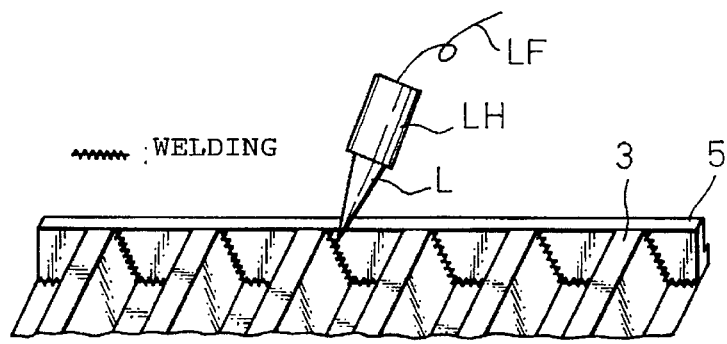
Figure 9D:
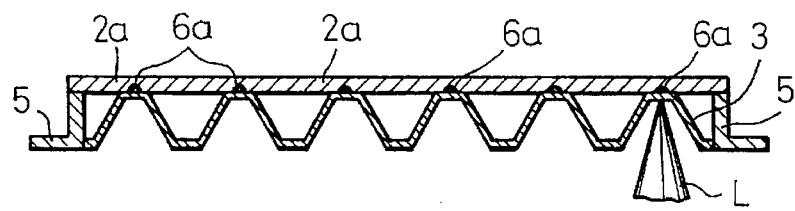
Figure 9E:
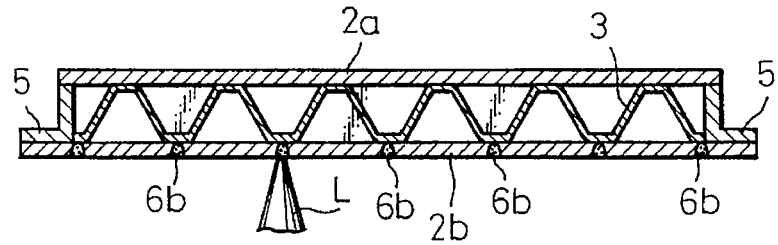
Figure 9C:
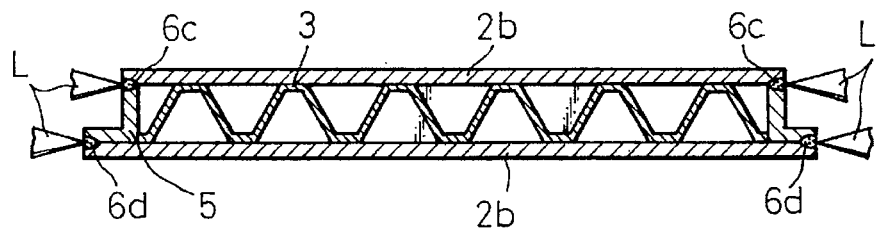

Thereafter, as shown in FIG. 9C, a face sheet $2a$-1 comprising the same material as the honeycomb core 3 was put on the honeycomb core 3, the face sheet $2a$-1 was joined from the side of the honeycomb core in such a way that no weld mark was exposed on the surface of the face sheet, and as shown in FIG. 9D, another face sheet $2b$-i was welded to the honeycomb core 3. The join $6d$ between the side plate 5 and the face sheets $2a$-1 and $2b$-1 was effected from the side of the side plate 5 in such manner that no weld mark was exposed on the surface of the face sheet.

EXAMPLES

The present invention will now be described by way of examples. It should be naturally recognized that the following examples principally explain the present invention and should not be construed as limiting the invention.

A honeycomb core constituting a honeycomb panel used in the following examples is made of a stainless steel as shown in FIG. 9A, has a thickness of 300 μm, is in a corrugated plate form comprising trapezoids continuous to each other wherein the period and height of waves are 35 mm and 40 mm, respectively, and the face in contact with the face sheet corresponds to the bottom of the trapezoid and has a width of 5 mm. Both face sheets $2a$ and $2b$ have a thickness of 2 mm. As shown in FIGS. 9B to 9E, the side plate 5 is in an L-shape and made of stainless steel. In the side plate 5, the height and width are each 40 mm, the length and wall thickness are 300 mm and 5 mm, respectively.

As shown in FIG. 9B, the joining of the corrugated plate 3 and the side plate 5 to each other was effected by contacting the end portion of its corrugation of the above-described honeycomb core and applying a welding laser beam L to the fitted portion. A continuous wave YAG laser commonly used in the conventional welding was used as the laser, and the laser beam was transmitted to a laser welding head LH by an optical fiber LF to effect welding. At that time, the welding was effected under conditions of an output of 240 W and welding rate of 1 m/min.

Thereafter, as shown in FIGS. 9C and 9D, a face sheet of a material similar to that of the honeycomb core is put on the honeycomb core, the face sheet $2a$ is first joined from the side of the honeycomb core under such a condition that no weld mark is exposed on the surface of the face sheet $2a$, as shown in FIG. 9C. At this time, the $CO_2$ laser welding was effected under conditions of an output of 1.5 KW and a welding rate of 4.5 m/min. Then, opposite face sheet $2b$ was welded. At this time, $CO_2$ laser welding was effected under conditions of an output of 5.0 KW and a welding rate of 4.0 m/min. Thereafter, the joining of the side plate to the face sheet was effected from the side of the side plate in such a manner that no weld mark was exposed on the surface of the face sheet. At this time, the $CO_2$ laser welding was effected under conditions of an output of 2 KW and a welding rate of 4.0 m/min.

Thus, a square honeycomb panel having a side length of 300 mm was formed. The above-described honeycomb panel provided with an L-shaped side plate was used to join the top of the flange of the side plate of the honeycomb panel to each other by TIG welding. Further, as shown in FIG. 3, the side plate 5 was joined to another T-shaped member 9. The honeycomb panels thus joined mutually to each other were subjected to a bending test. The test gave rise to no breaking of the joint or honeycomb panel. Further, the panels had no weld mark on the surface, and had excellent corrosion resistance.

POSSIBILITY OF UTILIZATION IN INDUSTRY

The present invention provides a honeycomb panel that can be easily joined to another honeycomb panel or other member, does not have the problems of the prior art in that a satisfactory strength can not be obtained in joining of the conventional honeycomb panels to an other and that there occurs a weld mark on the surface of the honeycomb panel. the invention can also provide a strong honeycomb panel, by using a side plate, and a honeycomb panel free from a weld mark on the surface of the honeycomb structure. This has made it possible to use a honeycomb panel which is more easy to assemble and has a better corrosion resistance as compared with the conventional honeycomb panel. Further, in the welding of the honeycomb core to the face sheet, the reduction in dimensional accuracy due to the size scattering produced by forming the honeycomb core can be prevent, the close contact of the flange portion of the honeycomb core with the face sheet can be ensured, and the honeycomb core can be successfully welded to the face sheet without weld defects.

We claim:

1. A process for producing a honeycomb panel, including a corrugated honeycomb core formed from a sheet having a thickness, said process comprising the following sequence of steps:

1) providing a side plate with a groove having a wider width than the honeycomb core sheet thickness for fitting an end face of the corrugated honeycomb core,
   2) filling up with a metal filler a clearance gap between the groove of said side plate,
   3) fitting the honeycomb core and side plate into each other
   4) laser beam welding along fitting portions from the side of the core, and then laser beam welding the side plate and the core to each other,
   5) laser beam welding the core at top portions of corrugations of the core to an upper face sheet from the side of the core,
   6) laser beam welding at bottom portions of corrugations of the core to a lower face sheet from the side of the lower face sheet,
   7) and laser beam welding the side plate to the upper and the lower face sheets.

2. A honeycomb panel comprising an integrated structure composed of a corrugated honeycomb core, a side plate, and upper and lower face sheets welded to the honeycomb core produced by means of a laser beam welding process according to claim 1.

3. A process for producing a honeycomb panel, including a corrugated honeycomb core formed from a sheet having a thickness, said process comprising the following sequence of steps:

1) providing a side plate with a groove having a wider width than the honeycomb core sheet thickness for fitting an end face of the corrugated honeycomb core,
   2) filling up with a metal filler a clearance gap between the groove of said side plate,
   3) fitting the honeycomb core and side plate into each other,
   4) laser beam welding along fitting portions from the side of the core, and then laser beam welding the side plate and the core to each other,
   5) laser beam welding the side plate to upper and lower face sheets,
   6) laser beam welding the core at top portions of corrugations of the core to the upper face sheet from the side of the core, and
   7) laser beam welding at bottom portions of corrugations of the core to the lower face sheet from the side of the lower face sheet.

4. A honeycomb panel comprising an integrated structure composed of a corrugated honeycomb core, a side plate, and upper and lower face sheets welded to the honeycomb core produced by means of a laser beam welding process according to claim 3.

* * * * *